(Model.)
H. SCHWARZWALDER.
NUT LOCK.
No. 288,263. Patented Nov. 13, 1883.
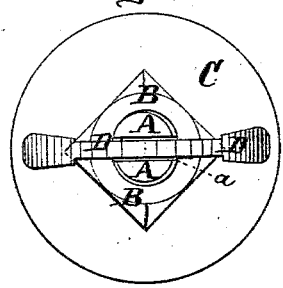
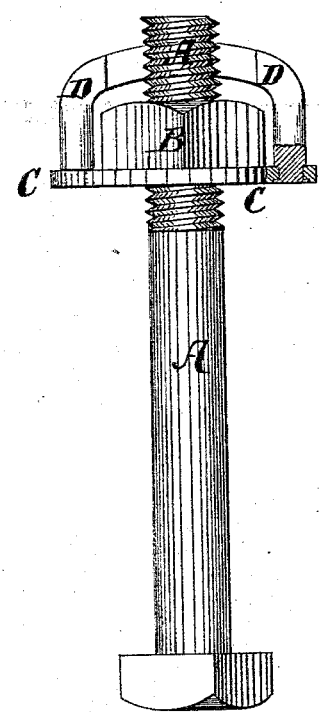
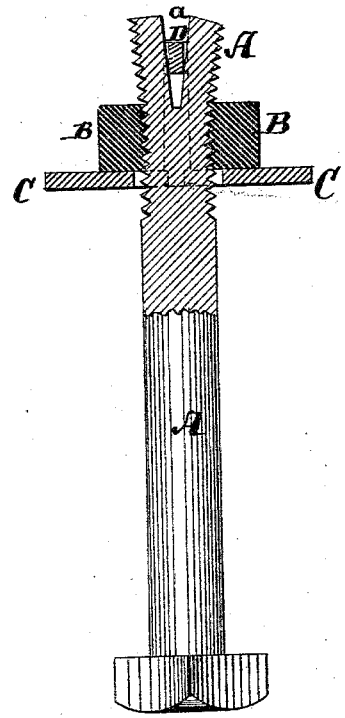
Witnesses:
John C. Tunbridge
John M. Speer
Inventor:
Henry Schwarzwalder
by his attorneys
Briesen & Steele

UNITED STATES PATENT OFFICE.

HENRY SCHWARZWALDER, OF NEW YORK, N. Y.

NUT-LOCK.

SPECIFICATION forming part of Letters Patent No. 288,263, dated November 13, 1883.

Application filed September 20, 1883. (Model.)

*To all whom it may concern:*

Be it known that I, HENRY SCHWARZWALDER, a resident of the city of New York, in the county and State of New York, have invented an Improved Nut-Lock, of which the following is a full, clear, and exact description, reference being made to the accompanying drawings, in which—

Figure 1 is a plan or top view of my improved nut-lock. Fig. 2 is a side view of the same, and Fig. 3 a central section thereof.

This invention relates to means for preventing nuts from working themselves loose on bolts or screws, whether used in vehicles—such as railroad-cars—or on stationary contrivances—such as railroad-rails—or in other places.

The invention consists in slitting the threaded end of the bolt, and in combining therewith a nut and a washer which carries a yoke that enters the slit in the end of the bolt, all as hereinafter more fully described.

In the drawings, the letter A represents a bolt or screw, and B is the nut, which is threaded to fit said bolt or screw. C is a washer or plate, having a yoke-like top piece, D.

The upper or threaded end of the bolt or screw A has a longitudinal slot, $a$, cut into it, into which the central portion of the yoke D enters when the device is in use. The nut will be between the body C of the washer and the yoke D when the parts are properly on the bolt. In screwing the nut home it crowds the washer along with it, and therefore draws the yoke D farther down into the slot $a$ of the bolt, the effect of which is that the yoke, acting as a wedge, will finally spread the slitted end of the bolt, as is shown in Fig. 3. In this position it will be impossible for the nut to become jarred loose, as it cannot ride up on the expanded thread of the spread bolt, and the yoke at the same time is held fast in the jaws of said spread bolt. A very strong wrench and great power will be needed to start the nut B on its backward motion, and as it is started the person who does it will have to take care to cause the washer C to follow it, so as thus gradually to move the yoke D out of the slot and get the bolt A back into normal cylindrical form by the operation of unscrewing the nut.

The yoke D may either be of the form shown in Fig. 2, or may be a projection on or attachment of the washer C, of any other form, provided it is adapted to enter the slit in the bolt while the nut is between the said entering portion and the body of the washer. Where the yoke or its equivalent enters into the slot $a$ it may either be of rectangular form, as shown in Fig. 3, in which case the slot may be tapering, or it may be wedge-like, in which case the slot may have parallel sides.

I claim—

The combination of the nut B with the traveling washer C, yoke D, and bolt A, having slit $a$, substantially as described.

HENRY SCHWARZWALDER.

Witnesses:
 THOMAS J. BURDY,
 CHAS. F. BAUERDORF.